June 8, 1937.  P. R. BASSETT  2,083,494
BINAURAL SYSTEM OF BLIND LANDING
Filed July 12, 1933   2 Sheets-Sheet 1
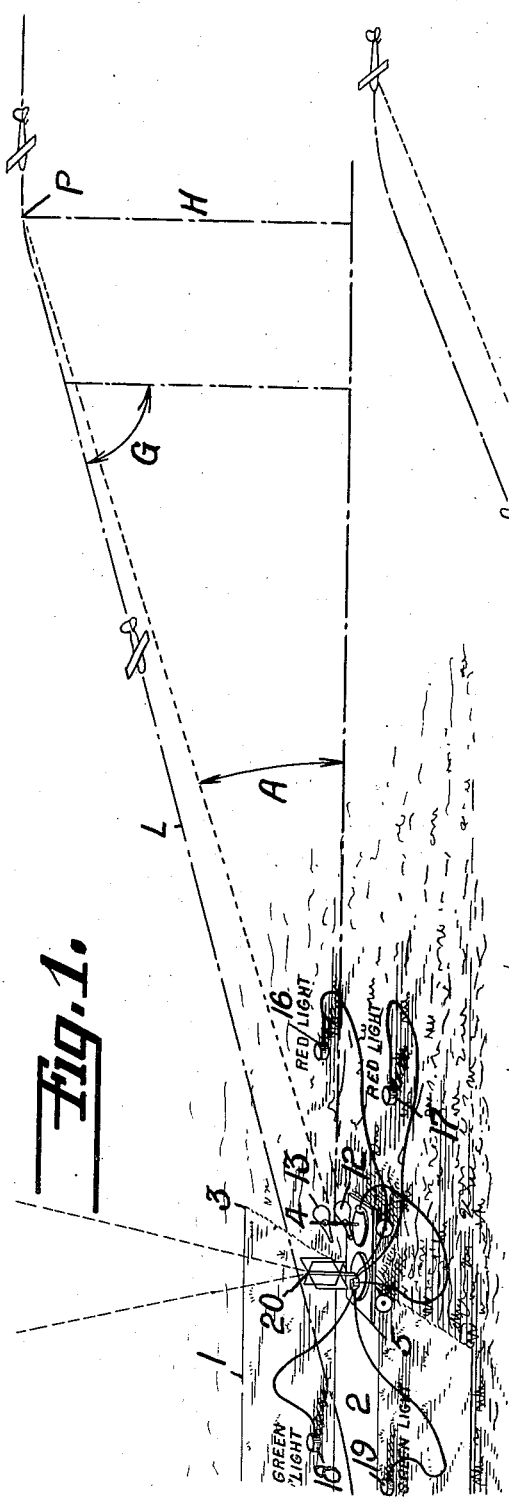
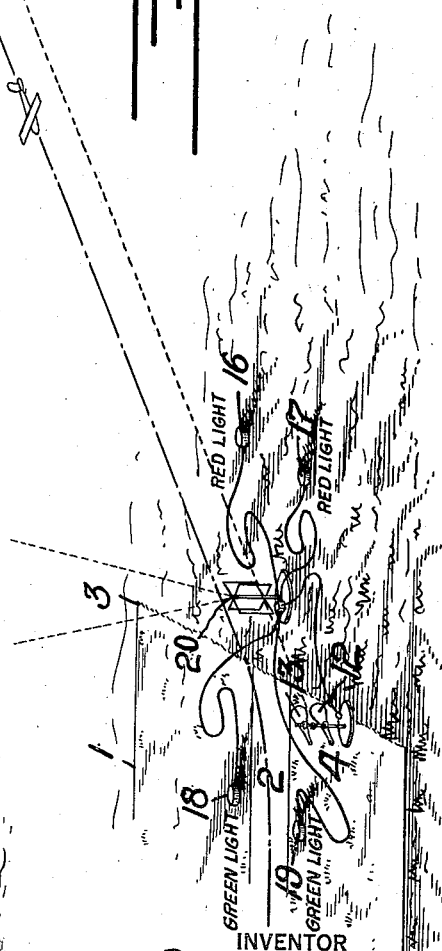
INVENTOR
PRESTON R. BASSETT.
BY
Herbert H. Thompson
HIS ATTORNEY.

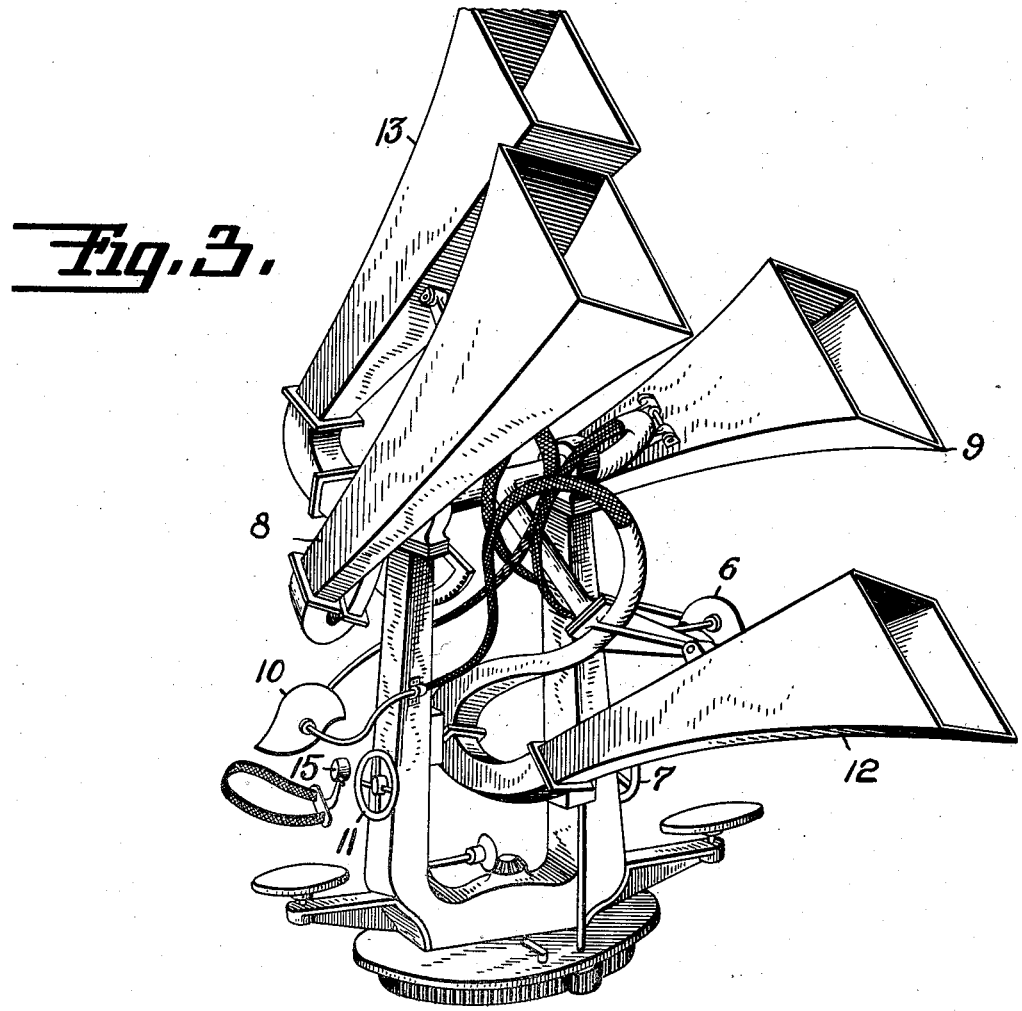

Patented June 8, 1937

2,083,494

UNITED STATES PATENT OFFICE 2,083,494

BINAURAL SYSTEM OF BLIND LANDING

Preston R. Bassett, Rockville Centre, N. Y., assignor to Sperry Gyroscope Company, Inc., Brooklyn, N. Y., a corporation of New York Application July 12, 1933, Serial No. 680,019

6 Claims. (Cl. 177—352)

This invention relates to the art of landing airplanes at an airport under adverse atmospheric conditions, such as in fog or heavy snow when the ground is concealed until almost reached. Such landings are usually referred to as blind landings. I am aware that elaborate radio controlled blind landing systems have been worked out involving a number of special radio receivers and other instruments on the aircraft, in addition to their present standard equipment, but aside from the complications introduced, such extra equipment adds weight and expense and is only used a very few times a year. According to my invention, I propose using only standard instruments and radio means on the aircraft which include an altimeter, an indicator (visible or audible) for enabling the operator to fly toward the source of a directional radio beam, and a two-way radio telephone sending and receiving set (or at least the receiving end of the same).

According to my system I propose to utilize a radio beacon producing a vertical radiating directional beam for bringing in the craft along a predetermined course but supplement the same by means of a binaural sound locator located at the airport which can determine with fair accuracy the position of the craft from the airport, thereby providing the necessary information for determining when the craft should start its descent. If, for instance, the aircraft is approaching at a predetermined altitude along the radio beacon course and the sound locator is set at a predetermined angle of elevation, the point at which the aircraft crosses the angle in elevation at which the sound locator is pointing, can readily be detected by binaural methods. The listener can then at this instant notify the aviator by radio telephone or other signal to start his downward glide to the airport. If the sound locator and radio beacon transmitter are located adjacent the forward end of the field, the gliding angle may be so arranged as to bring the aircraft directly over the radio transmitter, at which time the signals will cease temporarily so that the aviator will know he is nearing the ground.

According to the drawings

Fig. 1 shows diagrammatically one arrangement of my invention at an airport.

Fig. 2 shows a slightly different arrangement.

Fig. 3 shows a view of a typical binaural sound locator for both azimuth and elevation searching.

Referring first to Fig. 1, a typical landing field is shown at 1, one of the runways being at 2. In this instance a directional radio beacon transmitter 20 is shown as located adjacent the approach boundary 3 of the field. It will be understood that the beacon may be made portable so as to change its position with respect to the wind. When the airplane nears the field or sooner, if desired, the aviator picks up the directional radio beacon and flies toward the same preferably, but not necessarily, at a predetermined altitude known to the operators at the field. I have shown mounted adjacent said beacon a sound locator 4 preferably operating on the binaural principle. A convenient arrangement it to mount both on a trailer truck 5 so that they may be moved to any desired position on the field or from field to field. Said sound locator may be a complete binaural device in both azimuth and elevation, such as shown in Fig. 3, an operator being employed for each or it may be simplified for this particular use.

In Fig. 3 the listener at the helmet 6 operates the hand-wheel 7 to turn the device in azimuth and listens through the horns 8 and 9 spaced in azimuth, while the listener through the helmet 10 operates the elevation handwheel 11 to turn the elevation horns 12 and 13. According to my system, however, a complete binaural unit is not needed since the airplane may be assumed to be approaching along the known radio beam and hence said unit may be turned in the direction of the radio transmitter either by hand or automatically. Only the elevation horns 12, 13 need be used, therefore, to determine the angle of elevation A subtended by the craft. It will readily be seen that if the angle A and the altitude H are known, then the point P at which the aircraft is, is determined and the distance of the craft from the sound locator is known. Therefore, when the angle A is reached, the aircraft may be signalled to descend at a predetermined gliding angle G. Before reaching the angle A, the aviator would ordinarily be informed by radio by the listener at the helmet 10 that his craft is approaching the point where he should start his descent, and the angle of glide is given to him also, so that on being notified to descend, he immediately starts his glide to thereby bring his craft properly upon the field.

A simple method of determining the point P is to fix the horns in elevation at such an angle A that the aircraft will descend along the line L at its gliding angle G to bring it over the beacon and on to the runway 2 in the proper position. If the horns are set at this altitude, the listener can readily determine point P, at which point the main volume of sound shifts from one ear to the other. The listener preferably has a microphone 15 of a radio transmitter T strapped to him and when this sound shift occurs he tells the aviator immediately by wireless-telephone or other signal to descend at a predetermined gliding angle while remaining in the radio beacon. If desired, the field may also be equipped with guiding lamps or vertical beacons, i. e., light beacons that direct light rays upwardly, such as red or danger lamps 16 and 17 located beyond the approach border 3, and green or safety lamps 18 and 19 located within the runway at a point in which it is safe to contact with the ground. The aircraft, moving along line L, is close to the ground when passing over lamps 16, 17 and 18, 19, and hence the operator can see these lamps in spite of heavy fog.

It is desirable, though not essential, that the aircraft maintain a definite altitude when approaching the field since, regardless of its altitude, the pilot will be notified at the proper time, i. e., at the time the craft reaches angle A, to start his descent at the previously given gliding angle so as to land properly on the field. The higher the craft, the sooner it will reach an inclination with respect to the ground observer equal to angle A, and hence the sooner will the pilot be notified to start his descent.

A slightly different arrangement is shown in Fig. 2 in which the sound locator is placed at the boundary line 3 and the radio beacon transmitter 20 in advance thereof. This arrangement has a slight advantage over the prior arrangement in that the aircraft would fly in a higher elevation over the transmitter. As it passes directly over the beacon, he receives a further signal that he is approaching the field by the temparary silence of his radio direction finding apparatus. Many different arrangements of radio beacon and sound locator will occur to those skilled in the art.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of blind landing for radio-guided aircraft which consists in flying the aircraft toward an airport along a vertical directional radio beam, listening to the approach thereof by a sound locator set at a definite angle of elevation at the port, and signalling the aircraft by radio to glide down when the craft crosses the predetermined angle of elevation of the sound locator.

2. The method of blind landing for radio-guided aircraft which consists in flying the aircraft toward an airport along a vertical directional radio beam preferably at a predetermined altitude, listening to the approach thereof by a binaural sound locator having elevation horns fixed at a predetermined angle of elevation but adjustable in azimuth, and signalling the aircraft by radio to glide down when the received sound in the elevation horns shifts from one ear to the other of the listener.

3. In an airport for blind landings, a vertical directional radio beam transmitter arranged to be located at the approach side of the field, a sound locator set at a definite angle of elevation for locating the approaching craft, said sound locator being positioned adjacent said transmitter, and radio means for signalling the craft therefrom when the angle of elevation of the craft as determined by the sound locator reaches a predetermined amount.

4. In an airport for blind landings, a portable vertical directional radio beam transmitter arranged to be located at the approach side of the field, a portable sound locator for locating the approaching craft, said sound locator being positioned adjacent and to the rear of said transmitter, and radio means for signalling the craft therefrom when the angle of elevation of the craft as determined by the sound locator reaches a predetermined amount.

5. In an airport for blind landings, a local vertical directional radio beam transmitter arranged to be located at the approach side of the field, a sound locator set at a definite angle of elevation for locating the approaching craft, said sound locator being positioned adjacent said transmitter, and means for signalling the craft therefrom when the angle of elevation of the craft as determined by the sound locator reaches a predetermined amount.

6. In a system to supplement radio beam control for aircraft in blind landing, a binaural sound locator adapted to be positioned at a predetermined angle of elevation and directed in azimuth toward the approaching craft, and radio means whereby the craft may be signalled to descend when it crosses said elevation angle.

PRESTON R. BASSETT.